United States Patent [19]

Böing et al.

[11] Patent Number: 4,704,895
[45] Date of Patent: Nov. 10, 1987

[54] METHOD AND DEVICE FOR MONITORING ROLLER DRILLING TOOLS

[75] Inventors: Rolf Böing, Hagen; Dietmar Frase, Dittelbrunn; Manfred Noeske, Duisburg, all of Fed. Rep. of Germany

[73] Assignee: Bergwerksverband GmbH, Fed. Rep. of Germany

[21] Appl. No.: 893,688

[22] PCT Filed: Nov. 16, 1985

[86] PCT No.: PCT/EP85/00625

§ 371 Date: Aug. 6, 1986

§ 102(e) Date: Aug. 6, 1986

[87] PCT Pub. No.: WO86/03543

PCT Pub. Date: Jun. 19, 1986

[30] Foreign Application Priority Data

Dec. 8, 1984 [DE] Fed. Rep. of Germany ....... 3444846

[51] Int. Cl.⁴ .......................... G01L 5/00; G01N 3/58
[52] U.S. Cl. .................... 73/104; 73/862.54; 73/862.06
[58] Field of Search ................. 73/104, 865.9, 862.54, 73/862.06

[56] References Cited

U.S. PATENT DOCUMENTS 4,112,751  9/1978  Grünbaum ................... 73/862.54
4,118,933 10/1978  Coleman et al. .................. 73/766
4,203,319  5/1980  Lechler ........................ 73/862.54

FOREIGN PATENT DOCUMENTS 2746937  4/1979  Fed. Rep. of Germany .
2947937 11/1981  Fed. Rep. of Germany .
3230359  5/1983  Fed. Rep. of Germany .
2125926  9/1972  France .
2356920  1/1978  France .
1378685 12/1974  United Kingdom .
2113845  8/1983  United Kingdom .

Primary Examiner—Tom Noland

[57] ABSTRACT

To determine the load distribution over the drilling head region of mining machines or roadheading machines the loads occurring at the individual roller drilling tools and simultaneously also the rotational running condition of the roller drilling tools are determined by determining the tangential deformations occurring at one of the races of a roller bearing associated with each tool. For this purpose, a measuring point with a strain gauge is associated with each roller bearing, that is, with either the outer race or the inner race of the bearing. With only this single measuring point, information is obtained on the magnitude of the load on the roller drilling tool and on its rotational running condition, this taking place via a great number of pulses per revolution. As a result, substantially more accurate information is obtained, as well as a simplification of the device from the constructional point of view, in comparison to prior devices.

3 Claims, 6 Drawing Figures

METHOD AND DEVICE FOR MONITORING ROLLER DRILLING TOOLS

BACKGROUND OF THE INVENTION

The invention relates to a method for monitoring the cutting or wart rollers, in particular of roadheading machines in mining and tunnel construction, by determining the loads occurring at the individual rollers. The invention also relates to a device for carrying out the method with measuring points which are equipped with strain gauges and an evaluating unit.

Part-face and full-face heading machines which are used in underground mining and tunnel construction and equipped with roller drilling tools comprise a drill head which works the entire face in the heading and detaches the solid mineral. This extraction work is done with the aid of cutting or wart rollers which are arranged at the rotating front disc of the drill head or the hood-shaped drill head. The cutting and wart rollers fragmentate the rock by high pressure and for this purpose the roadheading machine is braced against the sidewalls with prop claws or supported correspondingly on the floor. To determine the load distribution across the drill head region of these heading machines the loads occurring at the individual roller drilling tools are measured by means of strain gauges. These measurements at the bearing pedestals however do not provide full information because they do not permit any assessment of the rotational running condition of the roller drilling tools. The monitoring of the proper rotational condition of the roller drilling tools, which permits conclusions to be drawn on the wear behavior and on sparking possibly caused by stationary rollers, must therefore be carried out in parallel. For this purpose an additional measuring point is employed which by means of a so-called cam pulse indicates each revolution of the cutting roller. A disadvantage in the known method and also of the known device for carrying out the known method is that separate measurements must be made, that separate measuring points are necessary, and that roller rotation stoppage is possibly measured and reported only after a delay.

The problem underlying the invention is to make it possible to measure in combination and accurately the loading and the rotational behavior of the roller drilling tools of a heading machine or the like and to provide a device suitable for this purpose.

SUMMARY OF THE INVENTION

The problem underlying the invention is solved in that tangential expansions are measured at the races of rolling bearings supporting the roller drilling tools.

By the method according to the invention it is surprisingly possible for each roller drilling tool to simultaneously reliably monitor, by means of a single signal, both the load applied to and the rotational behavior of, the roller drilling tool. The appearance of the signal itself indicates that no stoppage of the rotation of the associated tool has occurred, while the absolute magnitude of the signal is an indication of the magnitude of the load applied to its tool. The values determined in this manner are substantially more accurate and simpler to transfer than those in the already known methods. As a result, a quicker and more reliable reaction to the operational behavior is possible. In regard to the device, the problem is solved in that the measuring point is arranged in one of the races of the measuring bearing and is formed as a strain gauge. This solution is advantageous because the arrangement is then of simple construction since only one measuring point need be provided and observed for each tool. It permits the monitoring of all the necessary functions and obtains the corresponding information.

The aimed for strain gauge measuring point introduced to a bearing makes it possible to determine reliably and simply, during a cutting operation, simultaneously, the necessary exact information on the magnitude of the loading of and on the rotational movement or standstill of the associated roller drilling tool. The characteristics of the measuring signal depend on the change of voltages due to the rolling of the bearing elements over the measuring point. Thus, an oscillatory measuring signal is produced from which it is possible to clearly read or conclude the rotational behavior of the roller drilling tool. It is particularly advantageous that the rotational behavior of the roller drilling tool is determined via a plurality of pulses per revolution. Standstill of a roller drilling tool can thus be detected within a short time and corresponding action taken.

An advantageously protected arrangement of the measuring point and at the same time a measuring signal providing an exact representation of the magnitude of the loading of the roller drilling tool and its rotational behavior is obtained or possible in that according to the invention the measuring point is associated with the edge of the outer and/or inner race opposite the bearing elements.

In a further advantageous embodiment the measuring point is located in a recess associated with the bearing element path. This provides reliable and exact detection of the loading of the roller drilling tools and of their rotational behavior.

It is particularly advantageous with the present invention that a substantial simplification of the measuring method is achieved and that a constructionally simple device which is easy to attach is provided in which, with the same measuring point, at the same time the magnitude of the loading of a roller drilling tool can be exactly determined as well as its rotational behavior. An essential advantage is further that during a cutting operation a plurality of pulses can be received and evaluated, thus providing a high information density.

BRIEF DESCRIPTION OF THE DRAWINGS

Further details of the subject of the application will be explained in the follwing description of the Figures, wherein.

DESCRIPTION OF THE PREFERRED EMBODIMENTS

Figure 1:
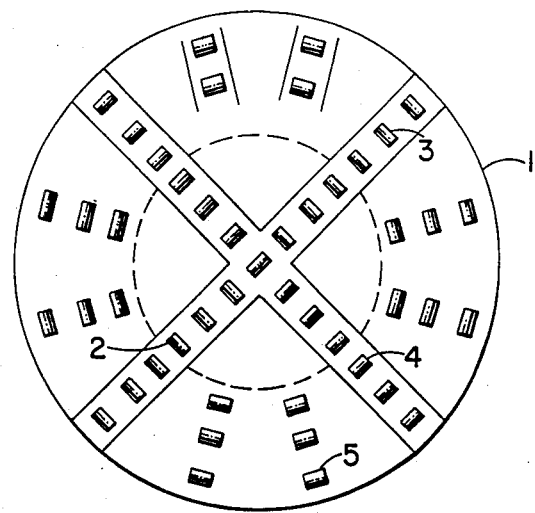
FIG. 1 is a front head view of a drill head of a full-face heading machine.

The drill head 1 illustrated in FIG. 1 is shown schematically and indicates substantially the arrangement of the various rollers 2, 3, 4, 5 via which the rock is cut and fragmentated by appropriate application pressure.

Each of the individual cutting rollers 2, 3, 4, 5 is equipped with a rolling bearing 6 as apparent from the fragment in FIGS. 2 to 5. Between the outer race 7 and inner race 9 a plurality of rolling bearing elements 8 is disposed which are intended to permit a uniform rotation of the cutting rollers 2 to 5. The outer race 7 may be the sleeve of the cutting roller and the inner race 9 the bearing axis of the cutting roller.

Figure 2:
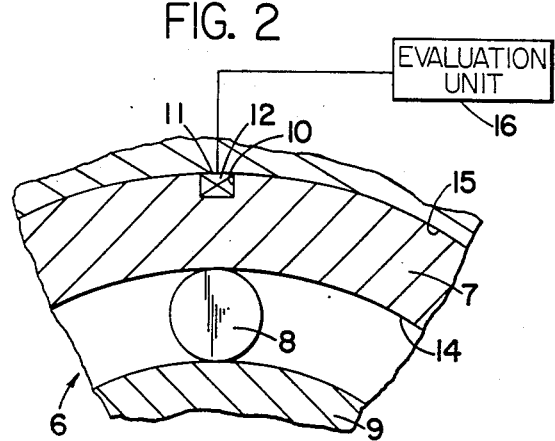
FIG. 2 is a cross-section through an antifriction or rolling bearing of a roller drilling tool with the measuring point in the outer race.
Figure 3:
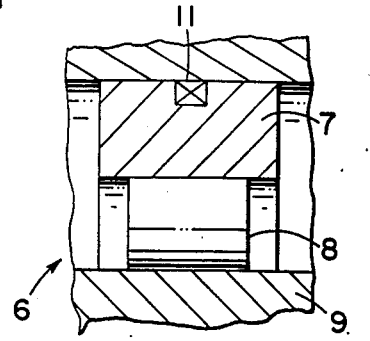
FIG. 3 is a longitudinal section corresponding to FIG. 2.

According to FIGS. 2 and 3, disposed in the outer race or ring 7 is a recess 10 which defines the measuring point 11, the measuring pickup of the measuring point 11 being a strain gauge 12 which is preferably adhered in the recess 10. According to FIGS. 4 and 5 this strain gauge 12 of the measuring point 11 is accommodated by a recess 10 of the inner race 9.

Figure 4:
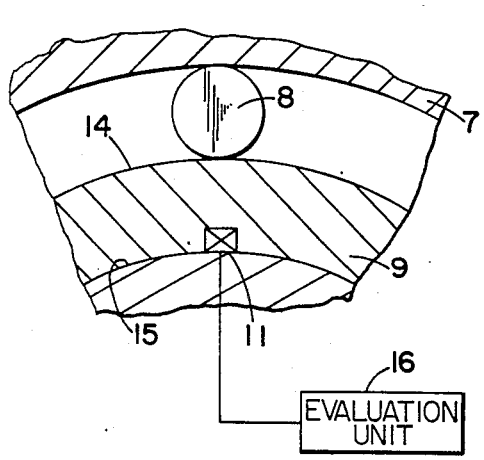
FIG. 4 is a cross-section of a rolling bearing with the measuring point in the inner race.
Figure 5:
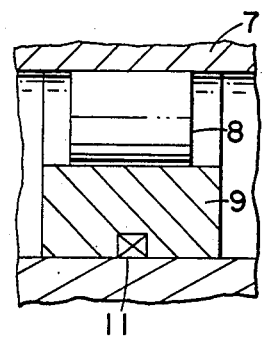
FIG. 5 is a longitudinal section corresponding to FIG. 4

Both the construction according to FIGS. 2 and 3 and the construction according to FIGS. 4 and 5 have the recess 10 and the measuring point 11 associated with circumferential surface 15 of a bearing race while the rolling bearing elements 8 act directly on the other circumferential surface 14 of the same race. In each case the strain gauge 12 is connected to an evaluation unit 16.

Figure 6:
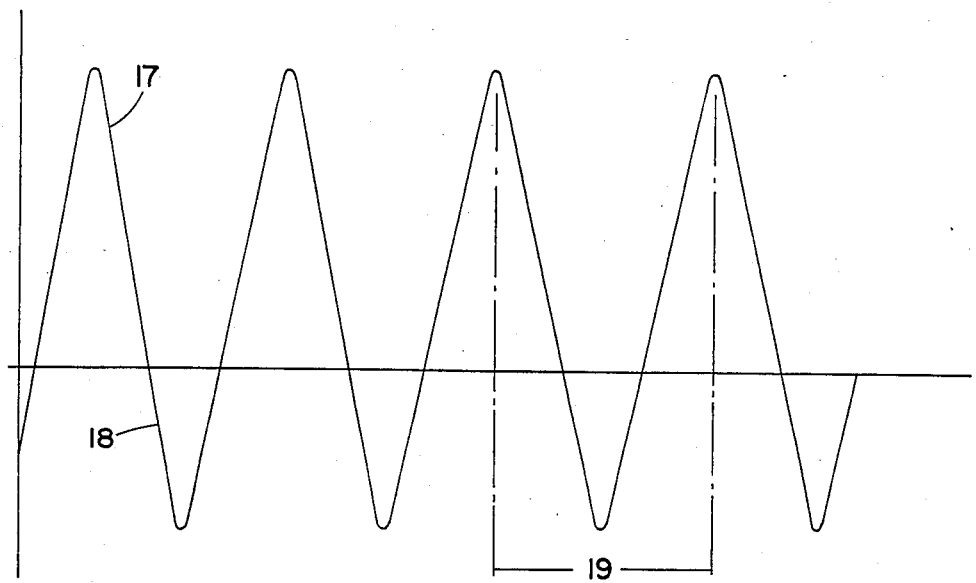
FIG. 6 is a graphical representation of a measuring signal produced during rotation.

FIG. 6 shows graphically the measuring signal produced during rotation of a cutting roller. It is distinguished by changes between extension regions 17 and stress regions 18, with the reference numeral 19 denoting the period between two successive maximum force introductions arising from a loading of the measuring point by the rolling bearing elements.

We claim:

1. The method of monitoring the cutting or wart roller drilling tools of a drilling machine used in mining and tunnel construction, wherein said roller drilling tools are mounted on anti-friction bearings having bearing races and rolling bearing elements running therebetween, said method comprising the steps of:

sensing the loads imposed on said roller drilling tools as well as the rotational condition of said tools, and transmitting the sensed values to an evaluation unit, characterized in that said sensing step is carried out on each roller drilling tool by measuring the tangential loading at only one measuring point of one of the two bearing races of the associated anti-friction bearing so as to provide a voltage having a magnitude dependent on the magnitude of said tangential loading and to also simultaneously provide oscillation in such voltage magnitude caused by the rolling bearing elements of said anti-friction bearing moving past said measuring point.

2. A device for monitoring the cutting or wart roller drilling tools of a drilling machine used in mining and tunnel construction, wherein said roller drilling tools are mounted on anti-friction bearings having bearing races and rolling bearing elements running therebetween, said device comprising:

means for providing a sensing point for each of said drilling tools to measure both the loading imposed on the drilling tool and its rotational condition, and an evaluation unit connected to measuring means, said measuring means being located at only a single measuring point on only one of the two bearing races of the associated anti-friction bearing, said single measuring point corresponding to one of said sensing points, and said measuring means consisting of a strain gauge located near the circumferential surface of said one bearing race which is opposed to the circumferential surface of said one bearing race engaged by the roller bearing elements of said anti-friction bearing.

3. A device as defined in claim 2 further characterised by said strain gauge being disposed in a recess formed in said bearing race circumferential surface.

* * * * *